US010747189B2

(12) United States Patent
Kogawara

(10) Patent No.: US 10,747,189 B2
(45) Date of Patent: *Aug. 18, 2020

(54) CENTRAL CONTROL DEVICE, CONTROL METHOD AND NON-TRANSITORY COMPUTER READABLE MEDIUM

(71) Applicant: OMRON Corporation, Kyoto (JP)

(72) Inventor: Toru Kogawara, Kyoto (JP)

(73) Assignee: OMRON Corporation, Kyoto (JP)

( * ) Notice: Subject to any disclaimer, the term of this patent is extended or adjusted under 35 U.S.C. 154(b) by 83 days.

This patent is subject to a terminal disclaimer.

(21) Appl. No.: 16/190,183

(22) Filed: Nov. 14, 2018

(65) Prior Publication Data

US 2019/0250576 A1 Aug. 15, 2019

(30) Foreign Application Priority Data

Feb. 15, 2018 (JP) .................................. 2018-024858

(51) Int. Cl.
*G05B 19/042* (2006.01)
*G05B 19/414* (2006.01)

(52) U.S. Cl.
CPC ......... *G05B 19/042* (2013.01); *G05B 19/414* (2013.01); *G05B 2219/2231* (2013.01); *G05B 2219/40182* (2013.01)

(58) Field of Classification Search
None
See application file for complete search history.

(56) References Cited

U.S. PATENT DOCUMENTS 5,237,322 A * 8/1993 Heberle .............. H04L 12/4135
340/870.13
5,333,299 A * 7/1994 Koval ..................... G06F 16/40
713/400

(Continued)

FOREIGN PATENT DOCUMENTS

EP 2660670 11/2013
JP 06071580 3/1994
JP 2002192486 7/2002

OTHER PUBLICATIONS

"Search Report of Europe Counterpart Application", dated Jun. 4, 2019, p. 1-p. 10.

(Continued)

*Primary Examiner* — Ramesh B Patel
(74) *Attorney, Agent, or Firm* — JCIPRNET

(57) ABSTRACT

The control system includes: a master device control part (20) controlling a master device (101) with a certain number of control axes (m) by using master information (Mm) composed of elements equal in number to the number of control axes; and a slave device control part (40) controlling a slave device (102) with a certain number of control axes (n) by using slave information (Sn) composed of elements equal in number to the number of control axes. A central control device (30) of the disclosure includes an abstracted master information creating part (31) for creating abstracted master information (AM6) having a fixed number of elements based on a predetermined manner for allocation and according to the number of elements of the received master information (Mm), and provides the abstracted master information (AM6) to the slave device control part (40) for creating the slave information (Sn).

10 Claims, 17 Drawing Sheets

(56) References Cited

U.S. PATENT DOCUMENTS

| | | | | |
|---|---|---|---|---|
| 5,458,048 | A | * | 10/1995 | Hohner ................ G05B 19/042 |
| | | | | 91/459 |
| 5,555,425 | A | * | 9/1996 | Zeller ................... G06F 13/364 |
| | | | | 710/110 |
| 6,026,701 | A | * | 2/2000 | Reboulet .................... B25J 3/02 |
| | | | | 33/25.1 |
| 2012/0143353 | A1 | * | 6/2012 | Kishi ......................... B25J 3/04 |
| | | | | 700/3 |
| 2015/0148952 | A1 | | 5/2015 | Shiratsuchi |
| 2016/0023355 | A1 | | 1/2016 | Komatsu et al. |
| 2019/0247996 | A1 | * | 8/2019 | Kogawara .............. B25J 9/1682 |
| 2019/0275667 | A1 | * | 9/2019 | Kogawara ........ G05B 19/41815 |

OTHER PUBLICATIONS

Tan Fung Chan et al., "Design and Experimental Studies of a Generalized Bilateral Controller for a Teleoperator System With a Six DOF Master and a Seven DOF Slave," IEEE/RSJ International Conference on Intelligent Robots and Systems, vol. 1, Sep. 12, 1994, pp. 415-422.

Ishii E et al., "Bilateral Teleoperation Based on Model System Design," ISIE 2005. Proceedings of the IEEE International Symposium on Dubrovnik, vol. 4, Jun. 20, 2005, pp. 1527-1532.

* cited by examiner (A) 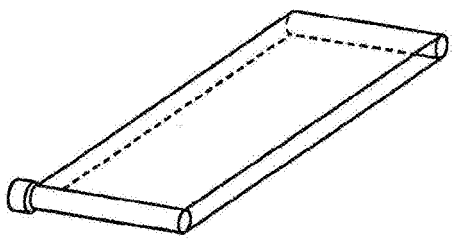
(B) 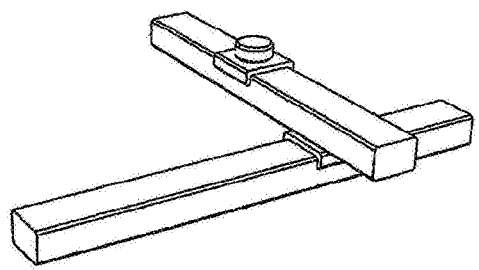
(C) 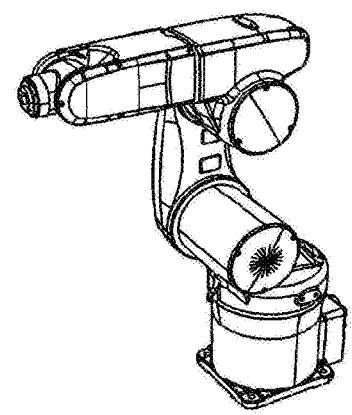
FIG. 2

(A)

Allocation setting storing part AST

AST1:

| Element in abstracted master information | Axis code | Magnification factor |
|---|---|---|
| X | | |
| Y | | |
| Z | | |
| Yaw | | |
| Pitch | | |
| Roll | | |

AST2:

| Element in abstracted master information | Axis code in master device | Magnification factor |
|---|---|---|
| X | A0 | 0.02 |
| Y | A1 | 0.01 |
| Z | 「0」Fixed | - |
| Yaw | 「0」Fixed | - |
| Pitch | 「0」Fixed | - |
| Roll | 「0」Fixed | - |

...

AST6:

| Element in abstracted master information | Axis code in master device | Magnification factor |
|---|---|---|
| X | X | 1.0 |
| Y | Y | 1.0 |
| Z | Z | 1.0 |
| Yaw | Yaw | 1.0 |
| Pitch | Pitch | 1.0 |
| Roll | Roll | 1.0 |

(B)

Extraction setting storing part EXL

EXL1:

| Element in abstracted master information | Used in | Warning |
|---|---|---|
| X | | |
| Y | | |
| Z | | |
| Yaw | | |
| Pitch | | |
| Roll | | |

EXL2:

| Element in abstracted master information | Used in slave device | Warning |
|---|---|---|
| X | YES | NO |
| Y | YES | YES |
| Z | NO | - |
| Yaw | NO | - |
| Pitch | NO | - |
| Roll | NO | - |

...

EXL6:

| Element in abstracted master information | Used in slave device | Warning |
|---|---|---|
| X | YES | YES |
| Y | YES | YES |
| Z | YES | YES |
| Yaw | YES | NO |
| Pitch | YES | NO |
| Roll | YES | NO |

FIG. 3

(A) Allocation setting correspondence table

AST2

| Row code | Element in abstracted master information | Axis code in master device | Magnification factor |
|---|---|---|---|
| 1 | X | A0 | 0.02 |
| 2 | Y | A1 | 0.01 |
| 3 | Z | 「0」Fixed | - |
| 4 | Yaw | 「0」Fixed | - |
| 5 | Pitch | 「0」Fixed | - |
| 6 | Roll | 「0」Fixed | - |

(B) Abstracted master information

AM6

| Row code | Element in abstracted master information | Value |
|---|---|---|
| 1 | X | ○○○ |
| 2 | Y | △△△ |
| 3 | Z | 0 |
| 4 | Yaw | 0 |
| 5 | Pitch | 0 |
| 6 | Roll | 0 |

FIG. 8

(A)
$$R = \begin{pmatrix} 1 & 1 & 0 & x' \\ 0 & 1 & 0 & y' \\ 0 & 0 & 1 & z' \\ 0 & 0 & 0 & 1 \end{pmatrix} \cdot Rz(Roll') \cdot Ry(Pitch') \cdot Rz(Yaw')$$

(B)
$$M = \begin{pmatrix} 1 & 0 & 0 & x \\ 0 & 1 & 0 & y \\ 0 & 0 & 1 & z \\ 0 & 0 & 0 & 1 \end{pmatrix} \cdot Rz(Roll) \cdot Ry(Pitch) \cdot Rz(Yaw)$$

(C)
$$S = M \cdot R$$

FIG. 14

CENTRAL CONTROL DEVICE, CONTROL METHOD AND NON-TRANSITORY COMPUTER READABLE MEDIUM

CROSS-REFERENCE TO RELATED APPLICATION

This application claims the priority benefit of Japan application serial no. 2018-024858, filed on Feb. 15, 2018. The entirety of the above-mentioned patent application is hereby incorporated by reference herein and made a part of this specification.

BACKGROUND

Technical Field

The disclosure relates to a central control device, and more particularly, to a central control device for a control system that controls a master device and a slave device in combination. The disclosure also relates to a control method and a program for such a control system.

Description of Related Art

Conventionally, as disclosed in Patent Document 1 (Japanese Laid-Open No. 6-71580), for example, a synchronous control method of a dual-arm robot which coordinately controls a master arm (master device) with a specific number of control axes and a slave arm (slave device) with a specific number of control axes is known.

Further, as disclosed in Patent Document 2 (Japanese Laid-Open No. 2002-192486), a robot control method that causes a robot (slave device) with a specific number of control axes to follow a workpiece mounted on a conveyor (master device) with a specific number of control axes and moving is known.

However, across the conventional examples, the control method is limited to those for a master device with a specific number of control axes and a slave device with a specific number of control axes in combination. Therefore, the type of the slave device, possible actions, etc. are restricted by the type of the master device. That is, the versatility of control is limited.

The disclosure provides a central control device for a control system that controls a master device and a slave device in combination, and the central control device is able to control a plurality of types of master devices with mutually different numbers of control axes and a plurality of types of slave devices with mutually different numbers of control axes in combination. The disclosure also provides a control method and a program for such a control system.

SUMMARY

An aspect of the disclosure provides a central control device for a control system that controls a master device and a slave device in combination. The control system includes: a master device control part controlling a master device with a certain number of control axes among a plurality of types of master devices with mutually different numbers of control axes by using master information having elements equal in number to the number of control axes; and a slave device control part controlling a slave device with a certain number of control axes among a plurality of types of slave devices with mutually different numbers of control axes by using slave information having elements equal in number to the number of control axes. In addition, the central control device includes an abstracted master information creating part sequentially receiving the master information from the master device control part and creating abstracted master information having a fixed number of elements based on a predetermined manner for allocation according to the number of elements of the received master information, and the central control device provides the abstracted master information to the slave device control part for creating the slave information.

Another aspect of the disclosure provides a control method for a control system that controls a master device and a slave device in combination. The control system includes: a master device control part controlling a master device with a certain number of control axes among a plurality of types of master devices with mutually different numbers of control axes by using master information having elements equal in number to the number of control axes; and a slave device control part controlling a slave device with a certain number of control axes among a plurality of types of slave devices with mutually different numbers of control axes by using slave information having elements equal in number to the number of control axes. The control method includes: sequentially receiving the master information from the master device control part; creating abstracted master information having a fixed number of elements based on and according to a predetermined manner for allocation according to the number of elements of the received master information. In addition, the central control device provides the abstracted master information to the slave device control part creating the slave information.

In yet another aspect of the disclosure, a program for causing a computer to execute the control method is provided.

BRIEF DESCRIPTION OF THE DRAWINGS

FIG. 2 is a diagram showing the appearance of various robots used as a master device or a slave device. (A) of FIG. 2 shows a belt conveyor as a one-axis device, (B) of FIG. 2 shows an X-Y table as a two-axis device, and (C) of FIG. 2 shows a six-axis robot.

(A) of FIG. 3 is a diagram schematically showing storage contents of an allocation setting storing part of the robot control system. (B) of FIG. 3 is a diagram schematically showing storage contents of an extraction setting storing part of the robot control system.

Figure 4:
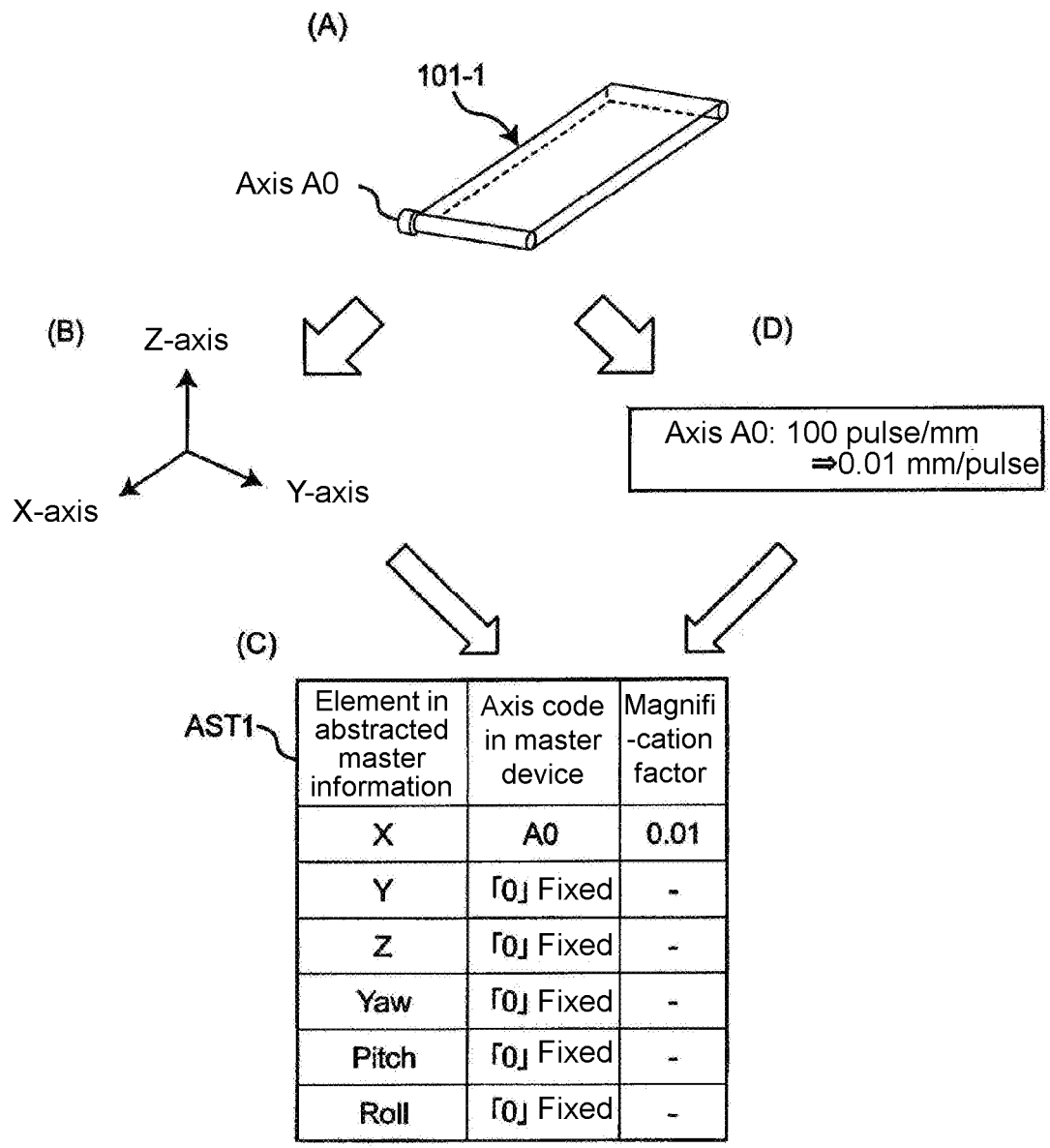

FIG. 4 is a diagram for explaining a manner for allocation from elements of master information to six elements of abstracted master information in a certain allocation setting correspondence table stored in the allocation setting storing part.

Figure 5:
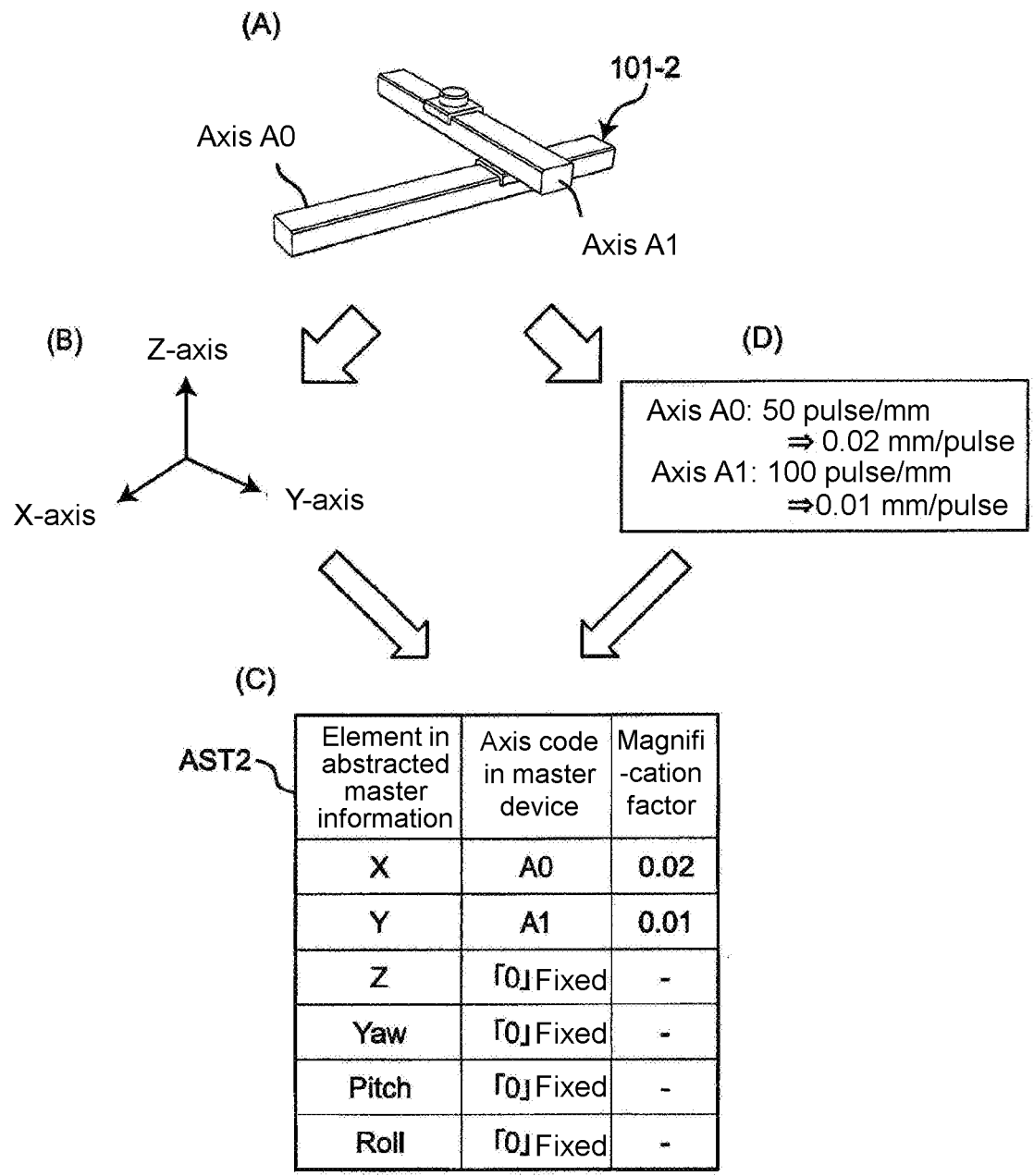

FIG. 5 is a diagram for explaining a manner for allocation from elements of master information to six elements of abstracted master information in another allocation setting correspondence table stored in the allocation setting storing part.

Figure 6:
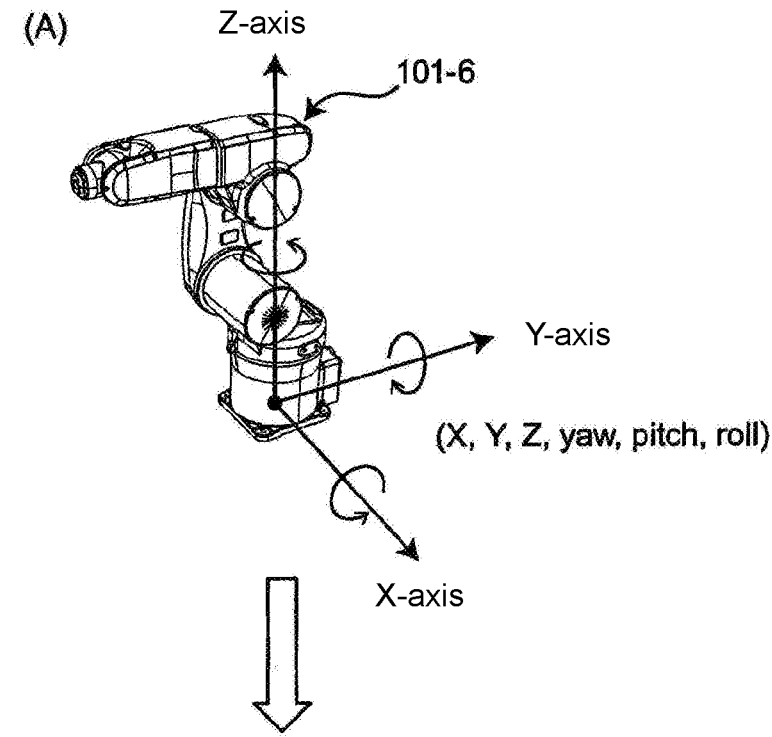

FIG. 6 is a diagram for explaining a manner for allocation from elements of master information to six elements of abstracted master information in still another allocation setting correspondence table stored in the allocation setting storing part.

Figure 7:
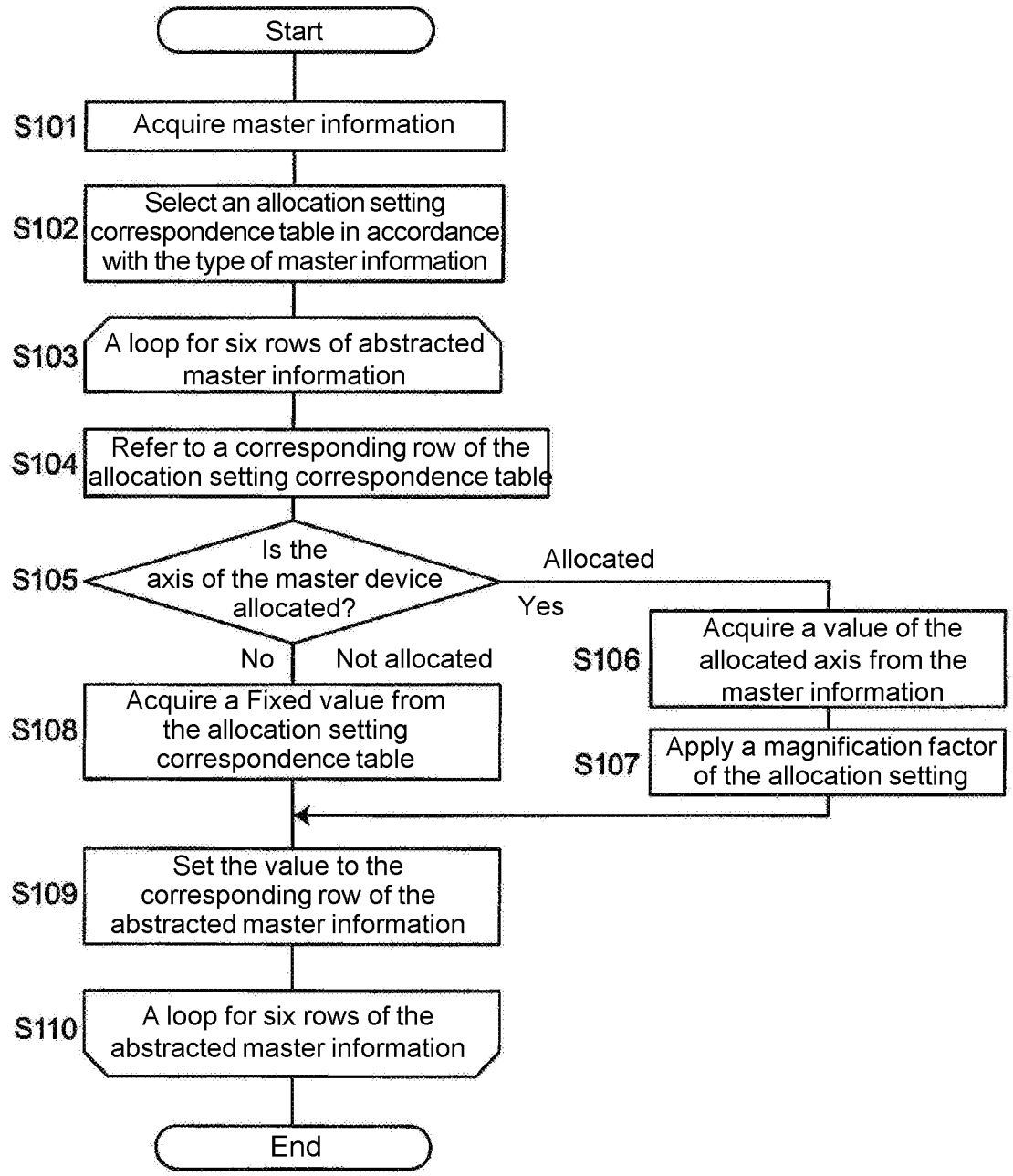

FIG. 7 is a diagram showing a flow of a control method for an embodiment which creates the abstracted master information from the elements of the master information in the central control part of the robot control system.

(A) of FIG. 8 is a diagram showing a format of an allocation setting correspondence table. (B) of FIG. 8 is a diagram showing a format of the abstracted master information created based on the allocation setting correspondence table.

Figure 9:
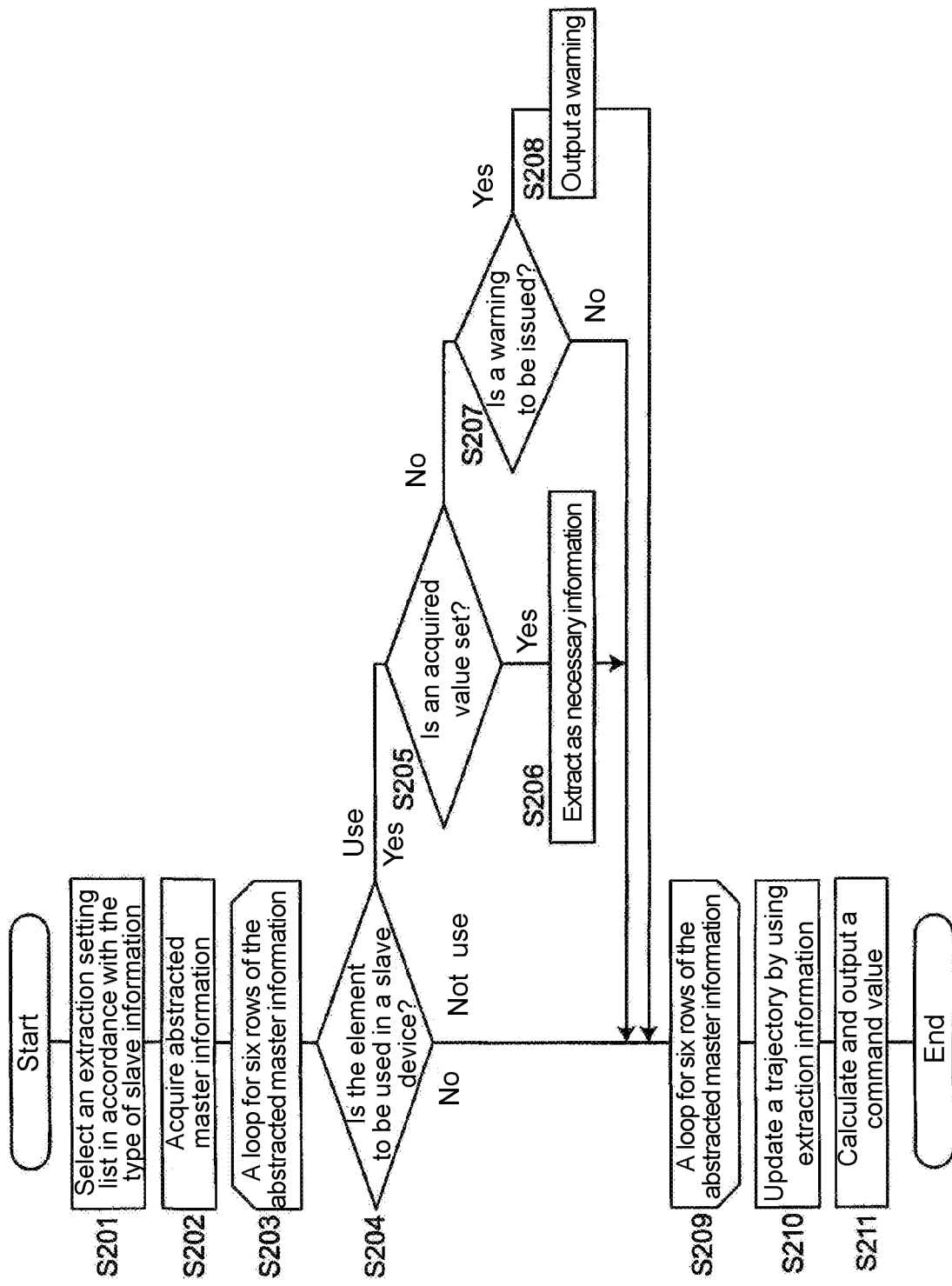

FIG. 9 is a diagram showing a flow of a control method for an embodiment which creates slave information from the abstracted master information in a slave device control part of the robot control system.

Figure 10:
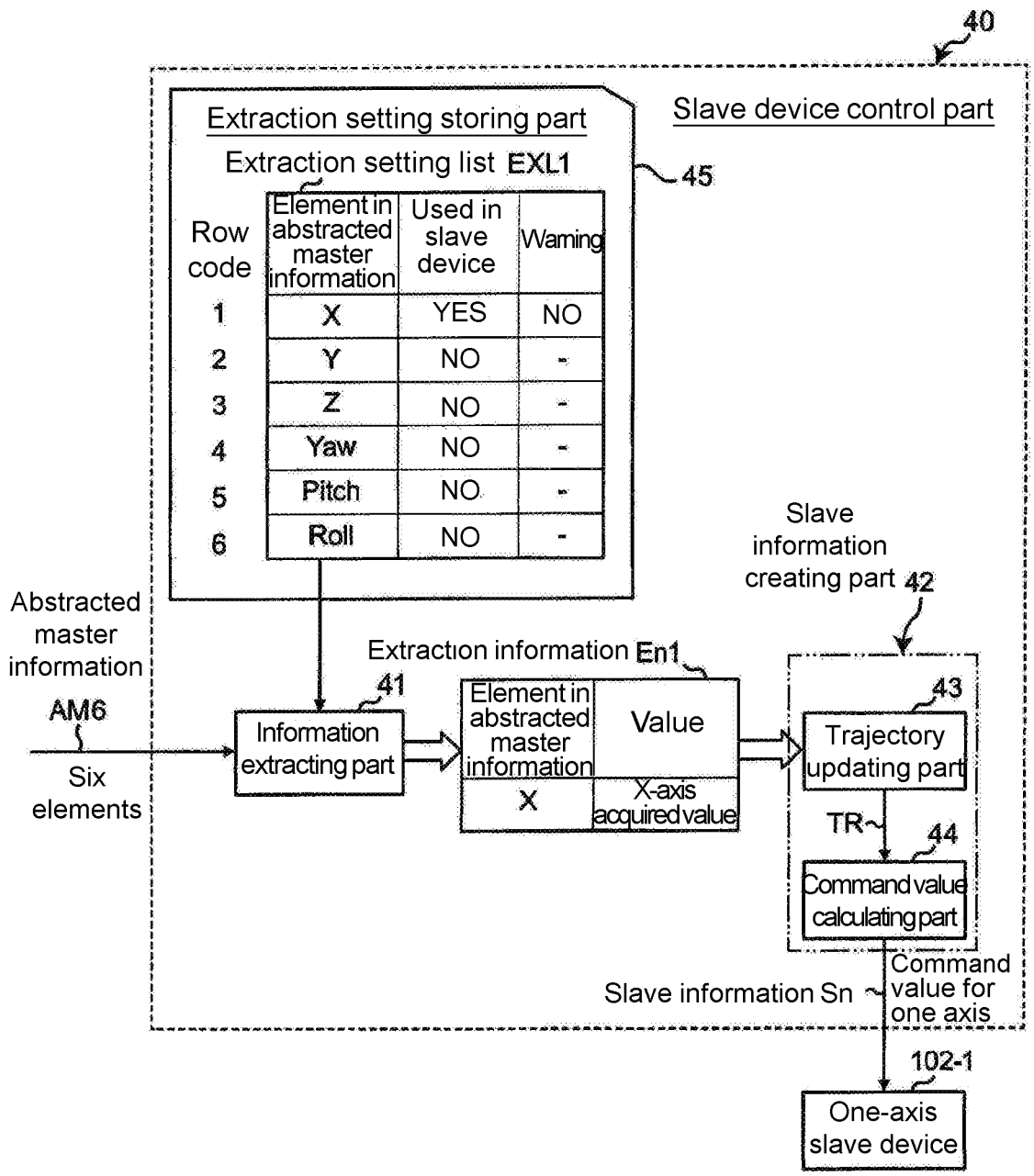

FIG. 10 is a diagram schematically showing contents of extraction information extracted based on a certain extraction setting list in the slave device control part.

Figure 11:
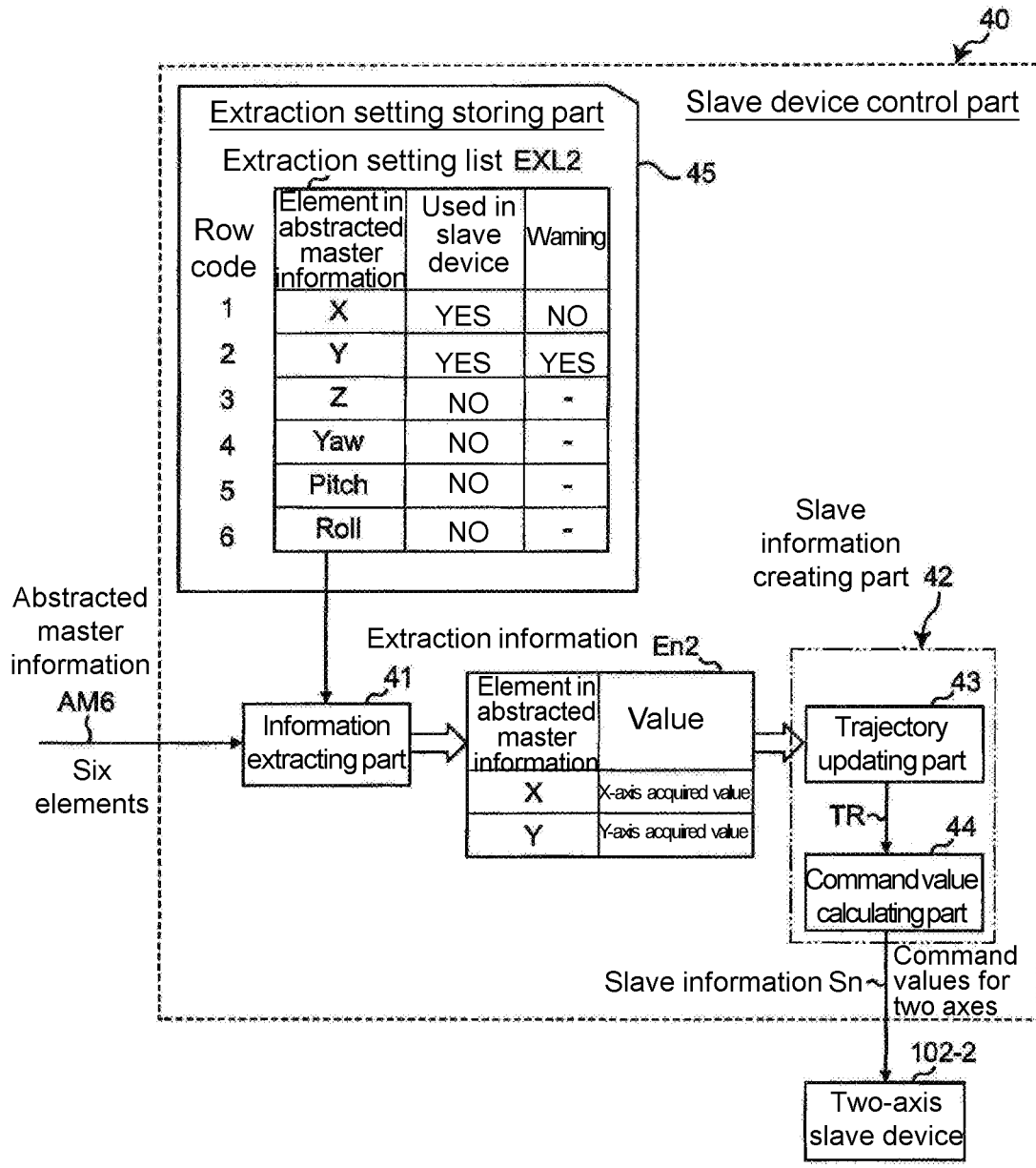

FIG. 11 is a diagram schematically showing contents of extraction information extracted based on another extraction setting list in the slave device control part.

Figure 12:
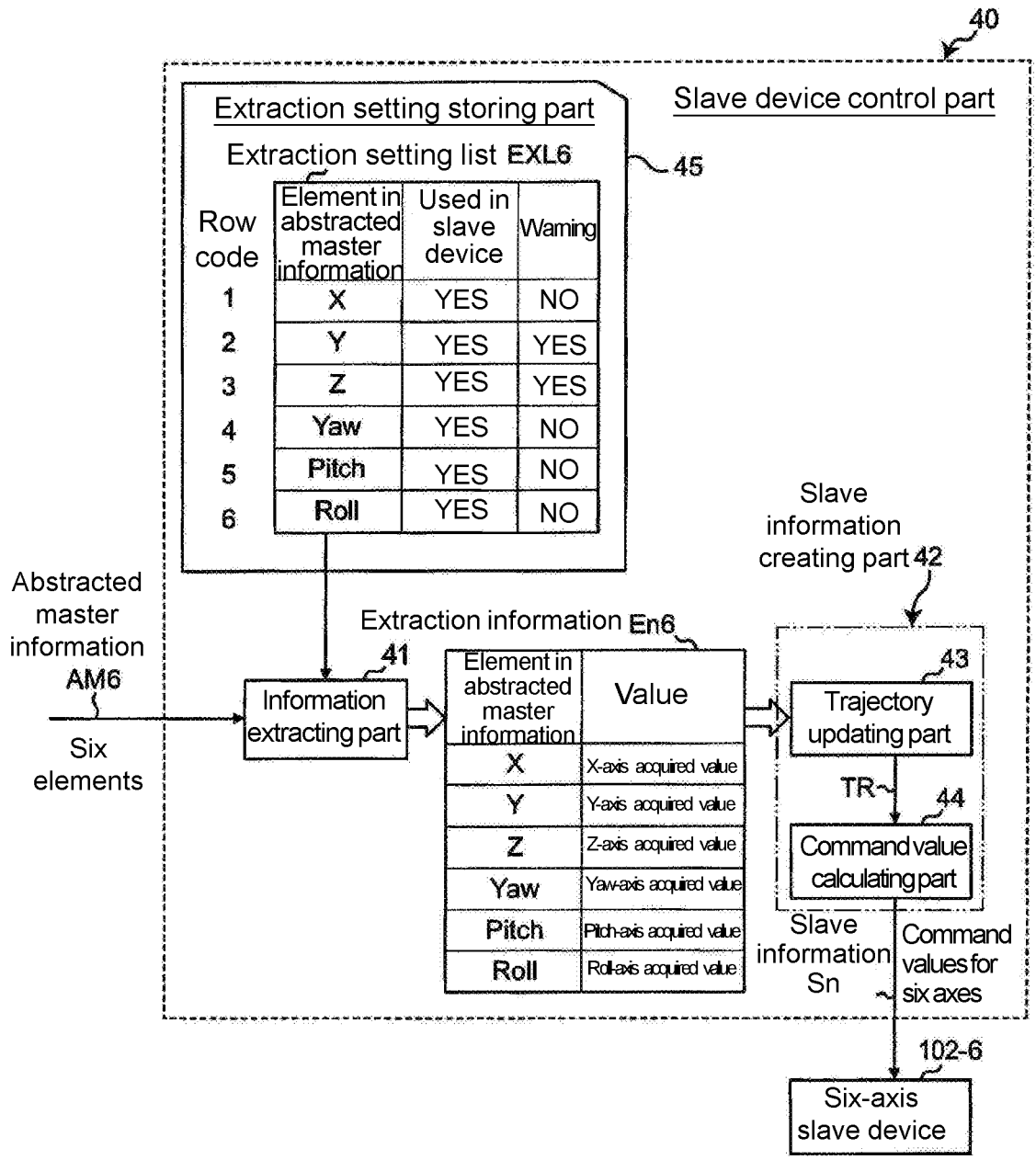

FIG. 12 is a diagram schematically showing contents of extraction information extracted based on still another extraction setting list in the slave device control part.

Figure 13:
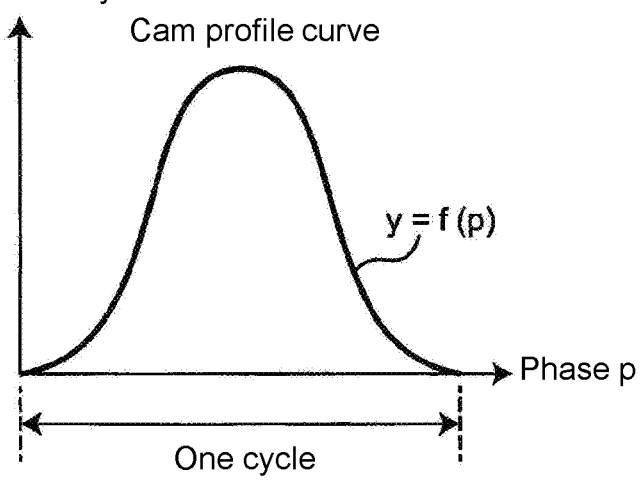

(A) of FIG. 13 is a diagram exemplifying a cam table serving to calculate updated slave information by using the extraction information. (B) of FIG. 13 is a diagram illustrating a cam profile curve serving to calculate the updated slave information by using the extraction information.

(A) of FIG. 14 is a diagram showing a matrix R representing a fixed relative position and orientation to be adopted by a slave device with respect to a master device. (B) of FIG. 14 is a diagram showing a matrix M representing extraction information extracted from the abstracted master information and sequentially updated at regular intervals. (C) of FIG. 14 is a diagram showing a matrix S representing a command value (position and orientation) for a slave device 102-6 calculated as the product of the matrix M and the matrix R.

Figure 15:
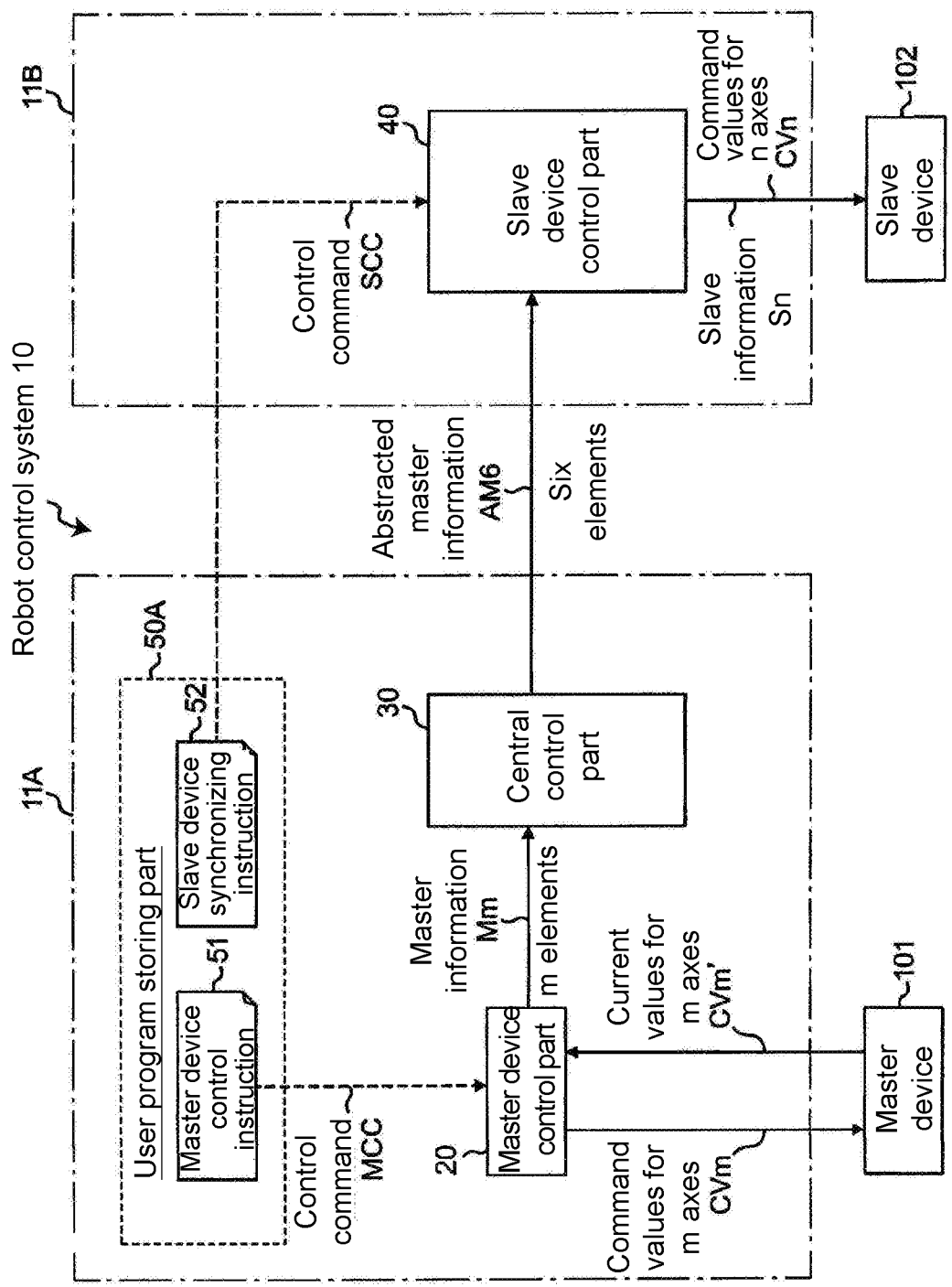

FIG. 15 is a diagram showing a mode in which both the master device control part and the central control part of the robot control system are accommodated in one housing and the slave device control part is accommodated in another housing.

Figure 16:
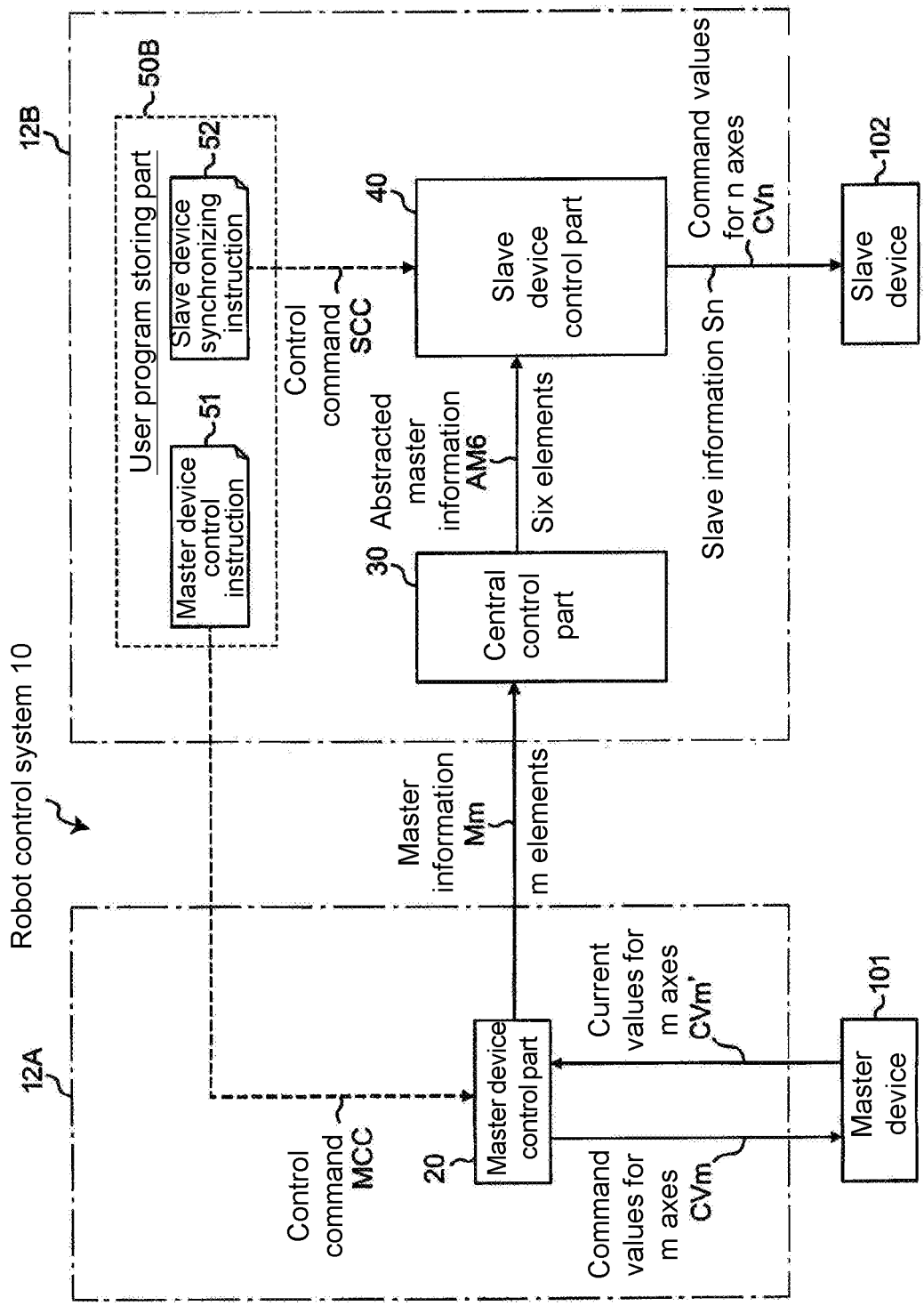

FIG. 16 is a diagram showing a mode in which the master device control part of the robot control system is accommodated in one housing, and the central control part and the slave device control part are housed in another housing.

Figure 17:
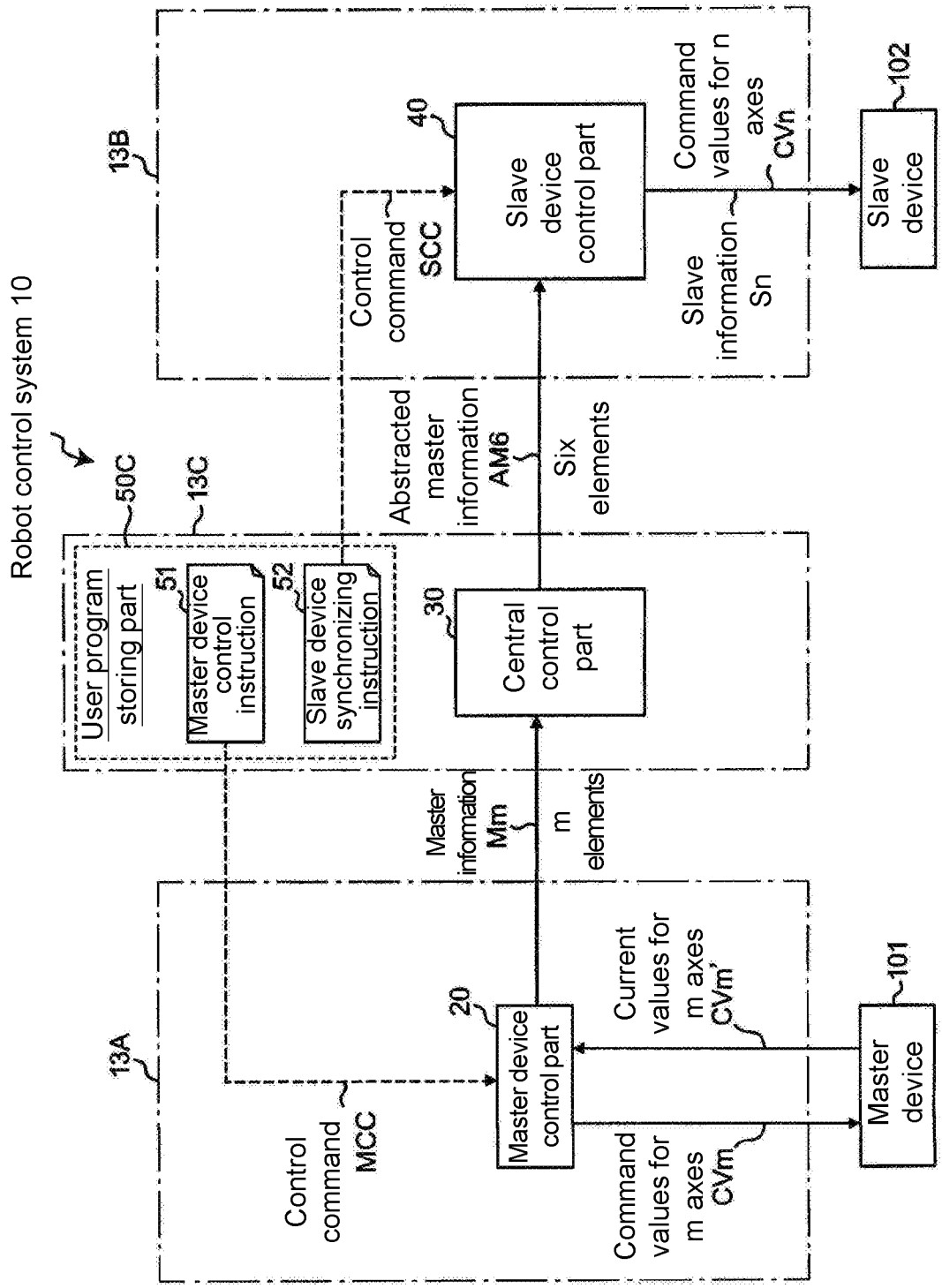

FIG. 17 is a diagram showing a mode in which the master device control part, the central control part, and the slave device control part of the robot control system are respectively accommodated in mutually different housings.

DESCRIPTION OF THE EMBODIMENTS

Hereinafter, embodiments of the disclosure will be described in detail with reference to the drawings.

Figure 1:
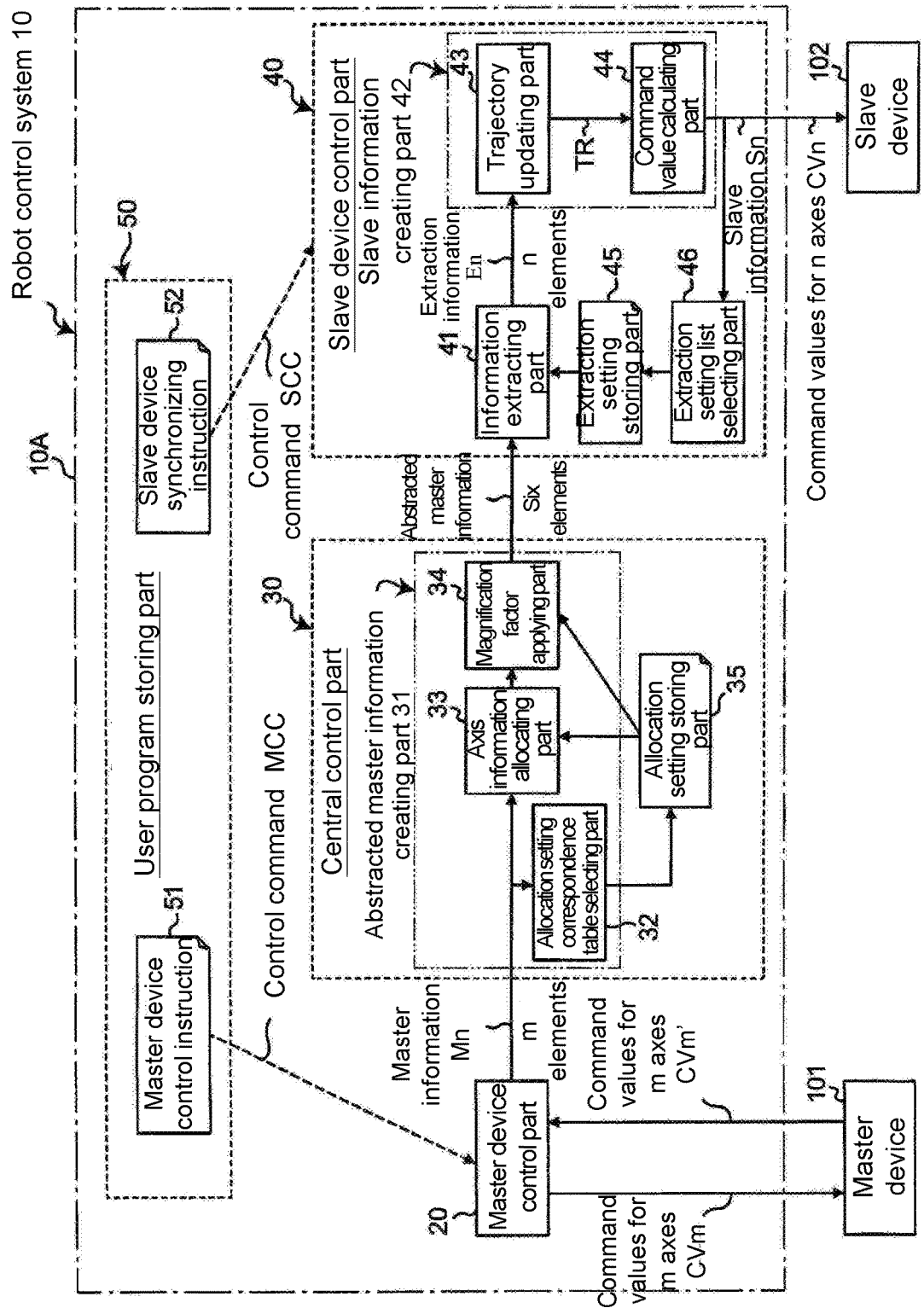
FIG. 1 is a diagram showing a schematic block configuration of a robot control system including a central control part according to an embodiment of a central control device of the disclosure.

FIG. 1 shows a block configuration of a robot control system 10 including a central control part (represented by reference numeral 30) according to an embodiment of a central control device of the disclosure. The robot control system 10 is a system devised to control a master device 101 and a slave device 102 in combination. Hereinafter, for the sake of simplicity, regarding the master device 101 and the slave device 102, "control axis" is simply referred to as "axis", and "number of control axes" is simply referred to as "number of axes".

As the master device 101, a device with a certain number of axes m (e.g., m=1, 2, 3, 4, 5, or 6) among a plurality of types of devices with mutually different numbers of axes, such as a belt conveyor as a one-axis device as shown in (A) of FIG. 2, an X-Y table as a two-axis device as shown in (B) of FIG. 2, a 6-axis robot as shown in (C) of FIG. 2, etc., serves as a target. Likewise, as the slave device 102, a device with a certain number of axes n (e.g., n=1, 2, 3, 4, 5, or 6) among a plurality of types of devices with mutually different numbers of axes serves as a target.

As shown in FIG. 1, in this example, the robot control system 10 includes a master device control part 20, a central control part 30 serving as a central control device, a slave device control part 40, and a user program storing part 50 mounted in one housing 10A (indicated by a dot-dash line).

In the user program storing part 50, a master device control instruction 51 is stored as a program for controlling the master device 101. In addition, in the user program storing part 50, a slave device synchronizing instruction 52 is stored as a program for synchronizing the slave device 102 with the master device 101.

The master device control part 20 receives the master device control instruction 51 as a control command MCC and controls the master device 101 with a certain number of axes m by using master information Mm composed of m elements equal in number to the number of axes m. That is, the master device control part 20 transmits command values CVm for m axes as the master information Mm to the master device 101, receives current values CVm' for m axes from the master device 101, and controls the master device 101. In this example, each element of the master information Mm is sequentially updated at regular intervals, whereby each axis of the master device 101 is respectively driven.

The slave device control part 40 generally receives the slave device synchronizing instruction 52 as a control command SCC, and creates slave information Sn for controlling the slave device 102 with a certain number of axes n based on abstracted master information AM6 to be described afterwards (details of creation manner will be described later). The slave information Sn includes n elements equal in number to the number of axes n of the slave device 102 to be controlled. In other words, the slave information Sn includes command values CVn for n axes. The slave device control part 40 controls the slave device 102 by using the slave information Sn.

The central control part 30 includes an allocation setting correspondence table selecting part 32, an axis information allocating part 33 and a magnification factor applying part 34, which constitute an abstracted master information creating part 31, and an allocation setting storing part 35.

In general, the abstracted master information creating part 31 sequentially receives the master information Mm (in particular, the current values CVm') from the master device control part 20, and creates the abstracted master information AM6 composed of elements in a fixed number (six elements in this example) based on a predetermined manner for allocation and in accordance with the number of elements m of the received master information Mm. In other words, the abstracted master information AM6 commonly composed of six elements is created from the elements of the master information Mm (the number of elements m can be various natural numbers of 6 or less). As illustrated in (B) of FIG. 8, the abstracted master information AM6 includes X (position on X-axis), Y (position on Y-axis) and Z (position on Z-axis), which are three elements representing degrees of freedom of translation, and Yaw (value of the yaw angle), Pitch (value of the pitch angle) and Roll (value of the roll angle), which are three elements representing degrees of freedom of rotation.

As exemplified in (A) of FIG. 3, the allocation setting storing part 35 stores the manner for allocation from the elements of the master information Mm to the six elements of the abstracted master information AM6 for each of the mutually different types of the master information Mm as an allocation setting correspondence table AST1, AST2, . . . , AST6 (in this example, AST1, AST2, . . . , AST6 are generally referred to with a reference symbol "AST") of the respective elements in this example. In this example, the types of the master information Mm include not only those having mutually different numbers of elements m but also those having mutually different properties (translation and rotation) of the elements. Each allocation setting correspondence table AST includes an "element in abstracted master information" column, an "axis code in master device" column, and a "magnification factor" column. The "element in abstracted master information" column represents X, Y, Z, Yaw, Pitch, and Roll, which are the six elements of the abstracted master information AM6. The "axis code in master device" column represents the elements of the master information Mm, which should correspond to the six elements, by axis code. The "magnification factor" column correspondingly stores, for each element to which the element of the master information Mm is allocated among the six elements, the magnification factor associated with the element. This serves to represent the value of the element in a suitable unit to allow the value of the element to have a physical meaning. Offset values (constant values) to be added to or subtracted from the values of the elements of the master information Mm may also be stored in advance in the allocation setting correspondence table AST in place of or in addition to the magnification factors.

For example, as shown in (A) of FIG. 4, the allocation setting correspondence table AST1 defines the manner for allocation from one element of the master information Mm to the six elements of the abstracted master information AM6 in the case where the master device 101 is a belt conveyor 101-1 which translates on one axis (axis A0). That is, in this example, the axis A0 in (A) of FIG. 4 corresponds to X-axis of the abstracted master information AM6 shown in (B) of FIG. 4. The reason for this is that the design of the entire production line is simplified by determining a uniform rule such as "the proceeding direction of the production line is X-axis". As a result, as shown in (C) of FIG. 4, the axis A0 is allocated to the element X of the abstracted master information AM6. In this example, the remaining elements Y, Z, Yaw, Pitch, and Roll of the abstracted master information AM6 are fixed to the value 0. Moreover, in this example, as shown in (D) of FIG. 4, the axis A0 of the belt conveyor 101-1 has a specification of moving 1 mm per 100 pulses, that is, 0.01 mm/pulse. Accordingly, a magnification factor of 0.01 is stored in correspondence with the element X of the abstracted master information AM6.

Moreover, as shown in (A) of FIG. 5, the allocation setting correspondence table AST2 defines the manner for allocation from two elements of the master information Mm to the six elements of the abstracted master information AM6 in the case where the master device 101 is an X-Y table 101-2 which translates on two axes (axis A0 and axis A1). That is, in this example, the axis A0 and the axis A1 in (A) of FIG. 5 respectively correspond to X-axis and Y-axis of the abstracted master information AM6 shown in (B) of FIG. 5. As a result, as shown in (C) of FIG. 5, the axis A0 and the axis A1 are respectively allocated to the elements X and Y of the abstracted master information AM6. In this example, the remaining elements Z, Yaw, Pitch, and Roll of the abstracted master information AM6 are fixed to the value 0.

Moreover, in this example, as shown in (D) of FIG. 5, the axis A0 of the X-Y table 101-2 has a specification of moving 1 mm per 50 pulses, that is, 0.02 mm/pulse. Furthermore, the axis A1 of the X-Y table 101-2 has a specification of moving 1 mm per 100 pulses, that is, 0.01 mm/pulse. Accordingly, magnification factors of 0.02 and 0.01 are respectively stored in correspondence with the elements X and Y of the abstracted master information AM6.

Furthermore, as shown in (A) of FIG. 6, the allocation setting correspondence table AST6 defines the manner for allocation from six elements of the master information Mm to the six elements of the abstracted master information AM6 in the case where the master device 101 is a six-axis robot 101-6 which translates on three axes (X, Y, Z) and rotates on three axes (Yaw, Pitch, Roll). In this example, as shown in (B) of FIG. 6, the six axes which are X, Y, Z, Yaw, Pitch, and Roll, of the master information Mm directly correspond to the 6 elements, which are X, Y, Z, Yaw, Pitch, and Roll of the abstracted master information AM6 respectively. Regarding each element of the abstracted master information AM6, a magnification factor of 1.0 is stored. When the master device 101 has the 6 axes X, Y, Z, Yaw, Pitch, and Roll, this manner for allocation is the simplest.

As can be seen from the examples above, when the elements X, Y, and Z of the master information Mm represent the degrees of freedom of translation, the elements X, Y, and Z are allocated to either of the three elements X, Y, and Z representing the degrees of freedom of translation in the abstracted master information AM6. Meanwhile, when the elements Yaw, Pitch, and Roll of the master information Mm represent the degrees of freedom of rotation, the elements Yaw, Pitch, Roll are allocated to either of the three elements Yaw, Pitch, Roll representing the degrees of freedom of rotation in the abstracted master information AM6. In this way, the manner for allocation can be determined relatively easily.

FIG. 7 is shows a flow of a control method for an embodiment which creates the abstracted master information AM6 from the elements of the master information Mm in the central control part 30.

Firstly, the allocation setting correspondence table selecting part 32 acquires the master information Mm (in particular, the current values CVm') from the master device control part 20 (Step S101 in FIG. 7) and selects the allocation setting correspondence table AST in accordance with the type of the master information Mm (Step S102 in FIG. 7).

In this example, in accordance with the master device 101 being the XY table 101-2 which translates on two axes (axis A0 and axis A1), the allocation setting correspondence table AST 2 (table shown in (C) of FIG. 5) is selected, as shown in (A) of FIG. 8.

Next, a loop for six rows of the abstracted master information AM6 is started (Step S103 in FIG. 7) by the axis information allocating part 33, as shown in (B) of FIG. 8. Then, regarding the row of interest of the abstracted master information AM6, by referring to the corresponding row of the allocation setting correspondence table AST2 shown in (A) of FIG. 8 (the row having the same code as that of the row of interest) (Step S104 in FIG. 7), whether the axis of the master device 101 is allocated (Step S105 in FIG. 7) is determined. Here, if the axis of the master device 101 is allocated (YES in Step S105 of FIG. 7), the value of the corresponding element is acquired from the master information Mm (Step S106 in FIG. 7). Then, the value of the element is multiplied by the magnification factor set in the corresponding row of the allocation setting correspondence table AST2 by the magnification factor applying part 34

(Step S107 in FIG. 7). Afterwards, the value after multiplication is set in the row of interest of the abstracted master information AM6 (Step S109 in FIG. 7).

For example, when the row of interest of the abstracted master information AM6 is the first row, the axis A0 of the master device 101 is allocated after referring to the corresponding row (first row) of the allocation setting correspondence table shown in (A) of FIG. 8. Therefore, the value of the corresponding element (the current value of the axis A0) is acquired from the master information Mm. Moreover, the value of the element is multiplied by the magnification factor (0.02 in this example) set in the corresponding row (first row) of the allocation setting correspondence table AST2. In this way, the value of the element can be provided with a physical meaning. Subsequently, the value after multiplication (represented by "○○○" in (B) of FIG. 8 in this example) is set in the row of interest (first row) of the abstracted master information AM6.

Also, when the row of interest of the abstracted master information AM6 is the second row, the axis A1 of the master device 101 is allocated after referring to the corresponding row (second row) of the allocation setting correspondence table shown in (A) of FIG. 8. Therefore, the value of the corresponding element (the current value of the axis A1) is acquired from the master information Mm. Then, the value of the element is multiplied by the magnification factor (0.01 in this example) set in the corresponding row (second row) of the allocation setting correspondence table AST2. In this way, the value of the element can be provided with a physical meaning. Subsequently, the value after multiplication (represented by "ΔΔΔ" in (B) of FIG. 8 in this example) is set in the row of interest (second row) of the abstracted master information AM6.

In addition, in replace of or in addition to the magnification factor, an offset value (a constant value) may also be stored in the allocation setting correspondence table AST in advance, and the offset value may be added to or subtracted from the value of the element of the master information Mm.

Meanwhile, if the axis of the master device 101 is not allocated in Step S105 of FIG. 7 (NO in Step S105 of FIG. 7), a fixed value set in the corresponding row of the allocation setting correspondence table AST2 is acquired by the axis information allocating part 33 (Step S108 in FIG. 7). Then, the fixed value is set in the row of interest of the abstracted master information AM6 (Step S109 in FIG. 7).

For example, when the row of interest of the abstracted master information AM6 is the third row, after referring to the corresponding row (third row) of the allocation setting correspondence table shown in (A) of FIG. 8, the axis of the master device 101 is not allocated. Therefore, a fixed value "0" set in the corresponding row (third row) of the allocation setting correspondence table AST2 is acquired. Then, the fixed value "0" is set in the row of interest (third row) of the abstracted master information AM6.

In this way, when the loop for six rows of the abstracted master information AM6 is ended (Step S110 in FIG. 7), the abstracted master information AM6 as shown in (B) of FIG. 8 is created.

In this example, the values of the six elements, which are X, Y, Z, Yaw, Pitch, and Roll, of the abstracted master information AM6 are "○ ○ ○", "ΔΔΔ", "0", "0", "0", "0", respectively.

In the following, to be distinguished from the fixed value "0", values acquired from the master information Mm (including values multiplied by multiplication factors, values obtained by adding or subtracting offset values, etc.), such as "○○○", "ΔΔΔ", etc., are referred to as "acquired values". Moreover, a flag indicating whether the acquired value is set may also be marked in each row of the abstracted master information AM6.

In the above example, the allocation setting correspondence table AST 2 (table shown in (C) of FIG. 5) is selected in accordance with the case where the master device 101 is the X-Y table 101-2 which translates on two axes (axis A0 and axis A1). However, the disclosure is not limited thereto. The allocation setting correspondence table AST1 shown in (C) of FIG. 4 may also be selected in accordance with the case where the master device 101 is the belt conveyor 101-1 that translates on one axis (axis A0). In addition, in accordance with the case where the master device 101 is the six-axis robot 101-6 which translates on three axes (X, Y, Z) and rotates on three axes (Yaw, Pitch, Roll), the allocation setting correspondence table AST6 shown in (B) of FIG. 6 may also be selected. In either case, the abstracted master information AM6 composed of six elements can be created based on the allocation setting correspondence table AST.

In this way, the central control part 30 (the abstracted master information creating part 31) creates the abstracted master information AM6 commonly composed of six elements from the elements of the master information Mm (the number of elements m can be various natural numbers of 6 or less). By referring to the allocation setting correspondence table AST, the abstracted master information creating part 31 can quickly create the abstracted master information AM6 from the elements of the master information Mm. The central control part 30 provides the created abstracted master information AM6 to the slave device control part 40 shown in FIG. 1 for creating the slave information Sn.

As shown in FIG. 1, the slave device control part 40 includes an information extracting part 41, a trajectory updating part 43 and a command value calculating part 44 constituting a slave information creating part 42, an extraction setting storing part 45, and an extraction setting list selecting part 46.

The information extracting part 41 generally sequentially receives the abstracted master information AM6 from the abstracted master information creating part 31, and extracts elements in a number in accordance with the number of elements n of the slave information Sn for the slave device 102 to be controlled by the slave device control part 40 from the six elements included in the received abstracted master information AM6 based on a predetermined manner for extraction to be described later.

As shown in (B) of FIG. 3, the extraction setting storing part 45 stores the manner for extraction from the six elements of the abstracted master information AM6 in accordance with the number of elements n of the slave information SN for each of the mutually different types of the slave information SN as an extraction setting list EXL1, EXL2, . . . , EXL6 (in this example, EXL1, EXL2, . . . , EXL6 are generally referred to with a reference symbol "EXL"). In this example, the types of the slave information Sn include not only those having mutually different numbers of elements n but also those having mutually different properties (translation and rotation) of the elements. Each extraction setting list EXL includes an "element in abstracted master information" column, a "used in slave device" column, and a "warning" column. The "element in abstracted master information" column represents X, Y, Z, Yaw, Pitch, and Roll, which are the six elements of the abstracted master information AM6. The "used in slave device" column indicates whether these six elements are respectively elements to be extracted, that is, whether these six elements are to be used in the slave device 102 (to be controlled by this slave device control part 40), with "YES" or "NO". In the "warning" column, regarding the element indicated as "YES" in the "used in slave device" column among the six elements of the abstracted master information AM6, whether a warning should be issued when an element (acquired value) from the master information Mm is not allocated to this element (element to be extracted) of the abstracted master information AM6 due to some abnormality is indicated with "YES" or "NO". The symbol "-" in the "warning" column means that whether a warning is issued is not determined.

For example, as shown in FIG. 10, the extraction setting list EXL1 is one for the case where the slave device 102 to be controlled is a slave device 102-1 with one axis (e.g., a one-axis electronic cam or an electronic gear, or the belt conveyor shown in (A) of FIG. 2), and the setting in the "used in slave device" column corresponding to the six elements of the abstracted master information AM6, which are X, Y, Z, Yaw, Pitch, and Roll, is respectively "YES", "NO", "NO", "NO", "NO", "NO". Moreover, the setting in the "warning" column is respectively "NO", "-", "-", "-", "-", "-".

Also, as shown in FIG. 11, the extraction setting list EXL2 is one for the case where the slave device 102 to be controlled is a slave device 102-2 with two axes (e.g., the X-Y table shown in (B) of FIG. 2), and the setting in the "used in slave device" column corresponding to the six elements of the abstracted master information AM6, which are X, Y, Z, Yaw, Pitch, and Roll, is respectively "YES", "YES", "NO", "NO", "NO", "NO". Moreover, the setting in the "warning" column is respectively "NO", "YES", "-", "-", "-", "-".

Moreover, as shown in FIG. 12, the extraction setting list EXL6 is one for the case where the slave device 102 to be controlled is a slave device 102-6 with six axes (e.g., the six-axis robot shown in (C) of FIG. 2), and the setting in the "used in slave device" column corresponding to the six elements of the abstracted master information AM6, which are X, Y, Z, Yaw, Pitch, and Roll, is respectively "YES", "YES", "YES", "YES", "YES", "YES". Moreover, the setting in the "warning" column is respectively "YES", "YES", "YES", "NO", "NO", "NO".

FIG. 9 shows a flow of a control method for an embodiment which creates the slave information Sn from the abstracted master information AM6 in the slave device control part 40.

Firstly, from the extraction setting lists EXL1, EXL2, EXL6 stored in the extraction setting storing part 45, the extraction setting list EXL in accordance with the type of the slave information Sn for the slave device 102 to be controlled by the slave device control part 40 is selected by the extraction setting list selecting part 46 (Step S201 in FIG. 9).

For example, in the case where the slave device 102 to be controlled is the slave device 102-1 with one axis (e.g., a one-axis electronic cam or electronic gear, or the belt conveyor as shown in (A) of FIG. 2), the extraction setting list EXL1 shown in FIG. 10 is selected. Also, in the case where the slave device 102 to be controlled is the slave device 102-2 with two axes (e.g., the X-Y table as shown in (B) of FIG. 2), the extraction setting list EXL2 shown in FIG. 11 is selected. Moreover, in the case where the slave device 102 to be controlled is the slave device 102-6 with six axes (e.g., the six-axis robot as shown in (C) of FIG. 2), the extraction setting list EXL6 shown in FIG. 12 is selected.

Next, the abstracted master information AM6 from the central control part 30 (the abstracted master information creating part 31) is received and acquired by the information extracting part 41 (Step S202 in FIG. 9).

Next, a loop for six rows of the abstracted master information AM6 is started by the information extracting part 41 (Step S203 in FIG. 9), as shown in (B) of FIG. 8. Then, regarding the row of interest in the abstracted master information AM6, whether the row of interest indicates an element to be used in the slave device 102 is determined by referring to the "used in slave device" column in the corresponding row (row with the same code as that of the row of interest) of the extraction setting list EXL (Step S204). Here, if the row of interest indicates an element to be used in the slave device 102 (YES in Step S204), whether the acquired value from the master information Mm is set in the row of interest of the abstracted master information AM6 is further determined (Step S205). This determination is made by, for example, identifying whether the value of the row of interest of the abstracted master information AM6 is the acquired value or the fixed value. Further, a flag indicating whether the acquired value is set in each row of the abstracted master information AM6 may also be marked in advance for the convenience of this determination. Here, if the acquired value is set in the row of interest of the abstracted master information AM6 (YES in Step S205), the acquired value set in the row of interest is extracted as necessary information (Step S206). Alternatively, if the acquired value is not set in the row of interest of the abstracted master information AM6 (NO in Step S205), whether a warning is to be issued is determined by referring to the "warning" column of the corresponding row of the extraction setting list EXL (Step S207). Here, if a warning is to be issued (YES in Step S207), the information extracting part 41 issues a warning (Step S208). The manner for issuing a warning includes various manners such as, for example, flashing a light emitting diode (LED) lamp provided in the slave device 102, stopping the processing of the slave device 102 as an abnormality, leaving the warning in the event history. As a result, maintenance personnel, etc., of the central control part 30, the slave device control part 40 and/or the robot control system 10 can promptly take appropriate measures. If the result after referring to the "warning" column of the corresponding row of the extraction setting list EXL is that a warning is not to be issued (NO in Step S207), the information extracting part 41 does not issue a warning. Then, the row of interest in the abstracted master information AM6 is moved to the next row. In this way, the loop for six rows of the abstracted master information AM6 is ended (Step S209).

Then, when the flow is terminated normally, for example, in the example where the extraction setting list EXL1 shown in FIG. 10 is selected, extraction information En1 composed of one element is acquired in correspondence with the one element X of the abstracted master information AM6, as shown in the same figure. The acquired value of the element is indicated as "X-axis acquired value". In addition, in the example where the extraction setting list EXL2 shown in FIG. 11 is selected, extraction information En2 composed of two elements is acquired in correspondence with the two elements X and Y of the abstracted master information AM6, as shown in the same figure. The acquired values of these elements are respectively indicated as "X-axis acquired value" and "Y-axis acquired value". Moreover, in the example where the extraction setting list EXL6 shown in FIG. 12 is selected, extraction information En6 composed of six elements is acquired in correspondence with the six elements X, Y, Z, Yaw, Pitch, and Roll of the abstracted master information AM6, as shown in the same figure. The acquired values of these elements are respectively indicated as "X-axis acquired value", "Y-axis acquired value", "Z-axis acquired value", "Yaw-axis acquired value", "Pitch-axis acquired value", and "Roll-axis acquired value".

In this way, the extraction information En1, En2, or En6 (generally referred to as extraction information En) composed of elements in a number in accordance with the number of elements n of the slave information Sn can be obtained. That is, the slave device control part 40 can quickly extract elements in a number in accordance with the number of elements n of the slave information Sn from the six elements of the abstracted master information AM6 by referring to the extraction setting list EXL stored in the extraction setting storing part 45.

Thereafter, in Step S210 of FIG. 9, the trajectory updating part 43 constituting the slave information creating part 42 updates and obtains a trajectory TR (composed of elements in a number in accordance with the number of elements n of the slave information Sn) for the slave device 102 by using the extraction information En (the values indicated by the extracted elements). Further, in Step S211 of FIG. 9, a command value (composed of elements in a number in accordance to the number of elements of n of the slave information Sn) in accordance with the trajectory TR is calculated and output. Accordingly, the slave information Sn is sequentially created by the slave information creating part 42 at regular intervals synchronized with updates of the master information Mm in this example.

For example, in accordance with a movement T (the current position is set as x) as the "X-axis acquired value" of the extraction information En 1 composed of one element, an updated command value (position) y of the electronic cam as the one-axis slave device 102-1 is calculated. With a master movement amount for one cycle of the cam profile being set as T, there is a relationship that a cam phase p=x mod T (x mod T means the remainder obtained through dividing x by T). A function y=f (p) representing the cam curve has been set in advance. In this case, the updated command value (position) y of the slave device 102-1 is calculated through y=f (p). During calculation, a cam table representing the correspondence between the phase p and the movement y as shown in (A) of FIG. 13, for example, may also be prepared to calculate the command value (position) y. The command value (position) y equivalent to the spacing of the cam table can be calculated and obtained through linear interpolation. Alternatively, the command value (position) y may also be calculated by using the cam profile curve y=f (p) defined around one cycle of the cam as shown in (B) of FIG. 13.

Further, in the case where the master device 101 is a six-axis robot, in accordance with the extraction information En6 composed of six elements, the updated trajectory of the six-axis slave device 102-6 is calculated and serves as a command value (position and orientation). Here, it is set that the slave device 102-6 is controlled with the position and orientation of the extraction information En6 (same as the abstracted master information AM6) as reference to maintain a fixed relative position and orientation. In this case, as shown in (A) of FIG. 14, the fixed relative position and orientation are set in advance by representing the constant relative position and orientation with the matrix R. Here, as shown in (B) of FIG. 14, the extraction information En6 (same as the abstracted master information AM6) that is sequentially updated at regular intervals is represented with the matrix M. Consequently, as shown in (C) of FIG. 14, the command value (position and orientation) for the slave device 102-6 is calculated as the matrix S=M R, that is, as the product of the matrix M and the matrix R. As a result, the slave device 102-6 can perform tracking including rotation in a three-dimensional space with respect to the master device 101.

In this way, the slave device control part 40 creates slave information Sn composed of elements in a number in accordance with the number of elements n of the slave information Sn and controls the slave device 102 by using the created slave information Sn. In other words, the slave device control part 40 controls the slave device 102 by using the slave information Sn composed of elements equal in number as the number of axes n of the slave device 102.

According to the above operation, the abstracted master information AM6 composed of six elements is sequentially created regardless of the number of elements m of the master information Mm (i.e., the number of axes m of the master device 101). Also, regardless of the number of elements n of the slave information Sn (i.e., the number of axes n of the slave device 102), the slave information Sn for controlling the slave device 102 is sequentially created from the abstracted master information AM6. Therefore, it is possible to control a plurality of types of the master devices 101 with mutually different numbers of axes m and a plurality of types of the slave devices 102 with mutually different numbers of axes n in combination.

For example, if the master device 101 with a certain number of axes m is switched to a master device with a different number of axes, and/or if the slave device 102 with a certain number of axes n is switched to a slave device with a different number of axes, the switched master device and/or slave device can be immediately controlled in combination according to the robot control system 10.

The robot control system 10 may be substantially constituted by a computer device (e.g., a programmable logic controller (PLC), etc.). For example, the master device control part 20, the abstracted master information creating part 31 of the central control part 30, and the information extracting part 41, the slave information creating part 42, and the extraction setting list selecting part 46 of the slave device control part 40 are constituted by a processor operating according to a program. Further, the allocation setting storing part 35, the extraction setting storing part 45, and the user program storing part 50 are constituted by a storage device such as a non-volatile semiconductor memory, etc. Therefore, the control method in the central control part 30 described with reference to FIG. 7 and the control method in the slave device control part 40 described with reference to FIG. 9 may be respectively set as programs for execution by a computer. Further, the control method in the central control part 30 described with reference to FIG. 7 and the control method in the slave device control part 40 described with reference to FIG. 9 may be set as one continuous program. In addition, these programs may be respectively recorded in a computer readable non-transitory recording medium. In this case, the control method can be implemented by causing a computer device to read and execute the programs recorded in the recording medium.

In the embodiment described above, as shown in FIG. 1, it is set that the master device control part 20, the central control part 30 as a central control device, the slave device control part 40, and the user program storing part 50, which constitute the robot control system 10, are mounted in one housing 10A (indicated by a one-dot chain line). However, the disclosure is not limited thereto.

For example, as shown in FIG. 15, it may also be set that both the master device control part 20 and the central control part 30 constituting the robot control system 10 are accommodated in one housing 11A, while the slave device control part 40 is accommodated in another housing 11B. In this example, a user program storing part 50A is provided in the housing 11A, and the user program storing part 50A stores the master device control instruction 51 and the slave device synchronizing instruction 52. The slave device synchronizing instruction 52 and the abstracted master information AM6 between the housings 11A and 11B are transmitted and received via, for example, Ethernet for Control Automation Technology (EtherCAT, registered trademark) by communication parts (not shown) mounted to the housings 11A and 11B respectively. The embodiment of FIG. 15 is suitable for dispersing the scale of a system. In particular, it is suitable when the number of axes in of the master device 101 is smaller than the number of axes n of the slave device 102.

In addition, as shown in FIG. 16, it may also be set that the master device control part 20 constituting the robot control system 10 is accommodated in one housing 12A, while the central control part 30 and the slave device control part 40 are accommodated in another housing 12B. In this example, a user program storing part 50B is provided in the housing 12B, and the user program storing part 50B stores the master device control instruction 51 and the slave device synchronizing instruction 52. The slave device synchronizing instruction 51 and the master information Mm are transmitted and received between the housings 12A and 12B by communication parts (not shown) mounted to the housings 12A and 12B respectively. The embodiment of FIG. 16 is suitable for dispersing the scale of a system. In particular, it is suitable when the number of axes m of the master device 101 is greater than the number of axes n of the slave device 102.

Moreover, as shown in FIG. 17, it may also be set that the master device control part 20, the central control part 30, and the slave device control part 40, which constitute the robot control system 10, are respectively accommodated in mutually different housings 13A, 13B, and 13C. In this example, a user program storing part 50C is provided in the housing 13C, and the user program storing part 50C stores the master device control instruction 51 and the slave device synchronizing instruction 52. The master device control instruction 51 and the master information Mm between the housings 13A and 13C as well as the slave device synchronizing instruction 52 and the abstracted master information AM6 between the housings 13C and 13B are transmitted and received by communication parts (not shown) mounted to the respective housings 13A, 13C and 13B. The embodiment of FIG. 17 is suitable for further dispersing the scale of a system.

In the above example, the abstracted master information AM6 is representatively set as being composed of six elements, but the number of elements is not limited thereto. For example, in the case mainly for the control of a four-axis horizontal articulated robot, the abstracted master information may be composed of four elements (X, Y, Z, Yaw).

Further, the control system of the disclosure is not limited to the case in which a so-called robot (e.g., a six-axis robot as shown in (C) of FIG. 2) as a control object is included. The disclosure is also suitable for the case where the master device 101 is, for example, a belt conveyor as shown in (A) of FIG. 2 and the slave device 102 is, for example, an X-Y table as shown in (B) of FIG. 2.

The above embodiments serve as examples, and various modifications are possible without departing from the scope of the disclosure. Each of the above-described embodiments can be established independently, but it is also possible to combine the embodiments. In addition, various features in different embodiments can also be established independently, but combinations of features in different embodiments are also possible.

In this specification, the "type" of the master device or the slave device includes not only those having mutually different numbers of control axes but also those having mutually different properties (translation and rotation) of the control axes.

In addition, the predetermined "manner for allocation" refers a corresponding manner indicating which element included in the master information having a certain number of elements is to be allocated to which element among a fixed number of elements (e.g., six elements) of the abstracted master information. Accordingly, the manner for allocation is determined differently as the number of elements, such as 1, 2, 3, 4, 5 or 6, of the master information varies.

Also, the value of each element of "master information" and the value of each element of "slave information" are sequentially updated respectively. Accordingly, each axis of the master device and each axis of the slave device are driven respectively.

Also, "central control device" may form part of the control system.

In the control system, the master device control part controls the master device with a certain number of control axes (e.g., 1, 2, 3, 4, 5, or 6) by using the master information composed of elements equal in number to the number of control axes. Here, in the central control device of the disclosure, the abstracted master information creating part sequentially receives the master information from the master device control part and creates the abstracted master information composed of a fixed number of elements based on the predetermined manner for allocation according to the number of elements of the received master information. In other words, the abstracted master information commonly composed of the fixed number of elements is created from the elements of the master information (the number of elements can be various natural numbers of 6 or less). Then, the abstracted master information is provided to the slave device control part creating the slave information.

The slave device control part sequentially receives the abstracted master information from the abstracted master information creating part, extracts elements in a number in accordance with the number of elements of the slave information from the fixed number of elements included in the received abstracted master information based on the predetermined manner for extraction and in accordance with the number of elements of the slave information (for the slave device to be controlled by the slave device control part itself), and creates the slave information by using the values indicated by the extracted elements. Then, the slave device control part controls the slave device by using the created slave information. In other words, the slave device control part controls the slave device by using the slave information composed of elements equal in number to the number of control axes.

The predetermined "manner for extraction" refers to a manner indicating which element is to be extracted from the fixed number of elements included in the abstracted master information. The number of extracted elements is set as a number in accordance with the number of elements of the slave information to be created.

According to the above operation, the abstracted master information composed of the fixed number of elements is sequentially created regardless of the number of elements of the master information (i.e., the number of control axes of the master device). Also, regardless of the number of elements of the slave information (i.e., the number of control axes of the slave device), the slave information for controlling the slave device is sequentially created from the abstracted master information. Therefore, it is possible to control a plurality of types of master devices with mutually different numbers of control axes and a plurality of types of slave devices with mutually different numbers of control axes in combination.

According to an embodiment of the disclosure, the central control device includes an allocation setting storing part storing, as a correspondence table of respective elements, a manner for allocation from the elements of the master information to the fixed number of elements of the abstracted master information for each of the master information with mutually different numbers of elements.

In the central control device of an embodiment, by referring to the correspondence table of the respective elements that is stored in the allocation setting storing part, the abstracted master information creating part can quickly create the abstracted master information from the elements of the master information.

In the central control device according to an embodiment of the disclosure, the correspondence table of the allocation setting storing part correspondingly stores, for each element to which the element of the master information is allocated among the fixed number of elements of the abstracted master information, a magnification factor associated with the element.

In the central control device according to an embodiment of the disclosure, when the abstracted master information creating part creates the abstracted master information, for example, for each element to which the element of the master information is allocated among the fixed number of elements of the abstracted master information, the value of the element is respectively multiplied by the corresponding magnification factor. Accordingly, the value of the element is respectively represented in a suitable unit, and the value of the element can be provided with a physical meaning.

In the central control device according to an embodiment of the disclosure, the fixed number of elements of the abstracted master information in the correspondence table include an element representing a degree of freedom of translation and an element representing a degree of freedom of rotation, when the element of the master information represents the degree of freedom of translation, the element is allocated to an element representing the degree of freedom of translation in the abstracted master information, and when the element of the master information represents the degree of freedom of rotation, the element is allocated to an element representing the degree of freedom of rotation in the abstracted master information.

In the central control device of an embodiment of the disclosure, the manner for allocation which allocates the elements of the master information to the fixed number of elements of the abstracted master information can be determined relatively easily.

According to the control method of the disclosure, the slave device control part sequentially receives the abstracted master information. The slave device control part extracts elements in a number in accordance with the number of elements of the slave information from the fixed number of elements included in the received abstracted master information based on the predetermined manner for extraction and according to the number of elements of the slave information, and creates the slave information by using the values indicated by the extracted elements. As a result, it is possible to control a plurality of types of master devices with mutually different numbers of control axes and a plurality of types of slave devices with mutually different numbers of control axes in combination.

The control method can be implemented by causing the computer device to execute the program.

As set forth above, according to the central control device, the control method and the program of the disclosure, in the control system that controls the master device and the slave device in combination, it is possible to control a plurality of types of master devices with mutually different numbers of control axes and a plurality of types of slave devices with mutually different numbers of control axes in combination.

What is claimed is:

1. A central control device for a control system that controls a master device and a slave device in combination, wherein the control system comprises a master device control part and a slave device control part for respectively controlling the master device and the slave device,
the central control device comprising a processor configured to function as:
an abstracted master information creating part sequentially receiving a master information from the master device control part and creating abstracted master information having a fixed number of elements based on a predetermined manner for allocation and according to the number of elements of the received master information, wherein
the abstracted master information is provided to the slave device control part for creating a slave information for controlling the slave device.

2. The central control device according to claim 1, wherein the processor is further configured to function as an allocation setting storing part storing, a correspondence table of respective elements of the master information, wherein a manner for allocation of the elements of the master information refers to a corresponding manner indicating which of the elements included in the master information having a certain number of elements is to be allocated to which element among a fixed number of elements of the abstracted master information.

3. The central control device according to claim 2, wherein the correspondence table of the allocation setting storing part correspondingly stores, for each element to which the element of the master information is allocated among the fixed number of elements of the abstracted master information, a magnification factor associated with the element.

4. The central control device according to claim 3, wherein the fixed number of elements of the abstracted master information in the correspondence table comprise an element representing a degree of freedom of translation and an element representing a degree of freedom of rotation, and
when the element of the master information represents the degree of freedom of translation, the element is allocated to an element representing the degree of freedom of translation in the abstracted master information, and
when the element of the master information represents the degree of freedom of rotation, the element is allocated to an element representing the degree of freedom of rotation in the abstracted master information.

5. The central control device according to claim 2, wherein the fixed number of elements of the abstracted master information in the correspondence table comprise an element representing a degree of freedom of translation and an element representing a degree of freedom of rotation, and when the element of the master information represents the degree of freedom of translation, the element is allocated to an element representing the degree of freedom of translation in the abstracted master information, and when the element of the master information represents the degree of freedom of rotation, the element is allocated to an element representing the degree of freedom of rotation in the abstracted master information.

6. The central control device according to claim 2, wherein each of the elements of the master information to the fixed number of elements of the abstracted master information with mutually different numbers of elements.

7. The central control device according to claim 1, wherein
the master device control part controls the master device with a certain number of control axes among a plurality of types of master devices with mutually different numbers of control axes by using master information having elements equal in number to the number of control axes; and
the slave device control part controls the slave device with a certain number of control axes among a plurality of types of slave devices with mutually different numbers of control axes by using slave information having elements equal in number to the number of control axes.

8. A control method for a control system that controls a master device and a slave device in combination, wherein
the control system comprises a master device control part and a slave device control part for respectively controlling the master device and the slave device,
the control method comprising:
sequentially receiving the master information from the master device control part;
creating abstracted master information having a fixed number of elements based on a predetermined manner for allocation and according to the number of elements of the received master information; and
providing the abstracted master information to the slave device control part for creating the slave information.

9. A non-transitory computer readable medium comprising a program for causing a computer to execute the control method according to claim 8.

10. The control method according to claim 8, further comprising:
storing a correspondence table of respective elements of the master information, wherein a manner for allocation of the elements of the master information refers a corresponding manner indicating which each of the elements included in the master information having a certain number of elements is to be allocated to which element among a fixed number of elements of the abstracted master information.

\* \* \* \* \*